(12) United States Patent
Raley

(10) Patent No.: US 11,959,790 B2
(45) Date of Patent: Apr. 16, 2024

(54) CYLINDER STORAGE CAGE MONITORING SYSTEM

(71) Applicant: Propane Hunter LLC, Plano, TX (US)

(72) Inventor: William Hunter Raley, Plano, TX (US)

(73) Assignee: Propane Hunter LLC, Plano, TX (US)

( * ) Notice: Subject to any disclaimer, the term of this patent is extended or adjusted under 35 U.S.C. 154(b) by 0 days.

(21) Appl. No.: 18/230,531

(22) Filed: Aug. 4, 2023

(65) Prior Publication Data

US 2024/0060810 A1 Feb. 22, 2024

Related U.S. Application Data

(60) Provisional application No. 63/398,431, filed on Aug. 16, 2022.

(51) Int. Cl.
| | |
|---|---|
| *G01F 23/00* | (2022.01) |
| *G01D 11/24* | (2006.01) |
| *G01F 23/292* | (2006.01) |
| *G01F 23/296* | (2022.01) |

(52) U.S. Cl.
CPC ......... *G01F 23/292* (2013.01); *G01D 11/245* (2013.01); *G01F 23/296* (2013.01)

(58) Field of Classification Search
CPC .... G01F 23/296; G01F 23/292; G01D 11/245
See application file for complete search history.

(56) References Cited

U.S. PATENT DOCUMENTS

| | | | |
|---|---|---|---|
| 10,119,657 B2 | 11/2018 | Suman | |
| 11,047,714 B2 * | 6/2021 | Boulay | ................ G01D 11/245 |
| 2017/0221136 A1 | 8/2017 | Ratermann | |
| 2018/0197138 A1 | 7/2018 | Ratermann | |
| 2022/0016788 A1 * | 1/2022 | Kim | ....................... B25J 19/023 |

FOREIGN PATENT DOCUMENTS

GB    2579844 A    7/2020

OTHER PUBLICATIONS

International Search Report and Written Opinion for International App. No. PCT/IB2023/057930, issued by the European Patent Office dated Nov. 3, 2023 (10 pages).

\* cited by examiner

*Primary Examiner* — Jamel E Williams
(74) *Attorney, Agent, or Firm* — Koenig IP Works, PLLC; Katherine Koenig

(57) ABSTRACT

Systems and methods for monitoring a supply of gas cylinders in a gas cylinder storage cage, such as identifying a number of full gas cylinders and a number of empty gas cylinders, and/or a total number of gas cylinders present in the gas cylinder storage cage, and displaying the determined numbers to a user. In one embodiment, a method includes: transmitting distance measurement data from a sensor within a gas cylinder storage cage to a control system of a cage monitoring system; determining, with the control system, whether a gas cylinder is present at a sensing location within the gas cylinder storage cage proximate the sensor; and when the control system determines that a gas cylinder is present at the sensing location, determining, with the control system, whether the gas cylinder is full or empty.

20 Claims, 12 Drawing Sheets

CYLINDER STORAGE CAGE MONITORING SYSTEM

CROSS-REFERENCE TO RELATED APPLICATIONS

This Application is related to and claims priority to U.S. Provisional Application No. 63/398,431, filed Aug. 16, 2022, entitled CYLINDER STORAGE CAGE MONITORING SYSTEM, the entirety of which is incorporated herein by reference.

GOVERNMENT RIGHTS STATEMENT

N/A.

TECHNICAL FIELD

The present technology is related generally to monitoring systems, and more specifically to a monitoring system for a storage cage for storing gas cylinders.

BACKGROUND

Pressurized gas, such as propane, butane, acetylene, and others, are commonly contained in a pressurized vessel, typically called a gas cylinder, for storage and/or transport. Because of the pressurization, the gas cylinders must be carefully handled and stored. Frequently, gas cylinders (such as those used to contain propane) are stored in a cylinder storage cage, from where they can be accessed for use and/or replacement. For example, a commercial facility may have one or more cylinder storage cages, in which full and/or empty gas cylinders are stored on their sides. Alternatively, a gas cylinder may be stored in the cylinder storage cage in an upright position. Gas suppliers may remove empty gas cylinders from and/or place full gas cylinders into the cylinder storage cage as part of routine supply management.

SUMMARY

Some embodiments advantageously provide systems and methods for monitoring a supply of gas cylinders in a gas cylinder storage cage, such as identifying a number of full gas cylinders and a number of empty gas cylinders, and/or a total number of gas cylinders present in the gas cylinder storage cage, and displaying the determined numbers to a user.

In one embodiment, a method of monitoring gas cylinder storage includes: transmitting distance measurement data from a sensor within a gas cylinder storage cage to a control system of a cage monitoring system; determining, with the control system, whether a gas cylinder is present at a sensing location within the gas cylinder storage cage proximate the sensor; and when the control system determines that a gas cylinder is present at the sensing location, determining, with the control system, whether the gas cylinder is full or empty.

In some aspects of the embodiment, the sensor is configured to: emit an amount of light toward the gas cylinder; receive the amount of light, the light being reflected from the gas cylinder; and determine an amount of time it takes for the amount of light to be reflected by the gas cylinder and to return to the sensor.

In some aspects of the embodiment, the sensor is a time-of-flight sensor.

In some aspects of the embodiment, the sensor is at least one of an IR sensor, a LIDAR sensor, and a laser sensor.

In some aspects of the embodiment, the step of determining, with the control system, whether the gas cylinder is full or empty includes calculating a distance between the sensor and the gas cylinder based on the amount of time it takes for the amount of light to be reflected by the gas cylinder and to return to the sensor.

In some as aspects of the embodiment, the method further includes displaying on a display at least one item of information about the control system, the at least one item of information including: a presence or absence of the gas cylinder at the sensing location; and a fill status of the gas cylinder at the sensing location.

In some aspects of the embodiment, the at least one item of information further includes: a wireless signal strength; and a battery charge level; a system component malfunction warning.

In one embodiment, a system includes: a gas cylinder storage cage; at least one sensing location within the gas cylinder storage cage; a sensor mounted within the gas cylinder storage cage at each of the at least one sensing location; and a control system in communication with each sensor.

In some aspects of the embodiment, the sensor is one of an ultrasonic sensor and a contract-sensitive switch.

In some aspects of the embodiment, the system further includes a gas cylinder positioned within the gas cylinder storage cage at one of the at least one sensing location.

In some aspects of the embodiment, each sensor is configured to measure a distance from the gas cylinder and the sensor and to transmit the distance to the control system as distance data.

In some aspects of the embodiment, the gas cylinder includes a first end, a second end opposite first end, and a collar at the first end, the collar extending from the first end in a direction that is opposite the second end.

In some aspects of the embodiment, each sensor is configured to: measure a distance from the first end of the gas cylinder to the sensor when the first end of the cylinder is proximate the sensor, and to not measure a distance from any portion of the collar to the sensor when the first end of the gas cylinder is proximate the sensor; and measure a distance from the second end of the gas cylinder to the sensor when the second end of the gas cylinder is proximate the sensor.

In some aspects of the embodiment, each sensor includes a light emitter and a light receiver, the light emitter being configured to direct an amount of light toward the gas cylinder and the light receiver being configured to receive the amount of light when the amount of light is reflected from the gas cylinder.

In some aspects of the embodiment, the control system includes a processor and a memory that are programmable to calculate a fill status of the gas cylinder based on the distance data.

In some aspects of the embodiment, the processor and memory are programmable to determine that: the gas cylinder is full when the distance data indicates the gas cylinder is a first distance from the sensor; and the gas cylinder is empty when the distance data indicates the gas cylinder is a second distance from the sensor, the second distance being greater than the first distance.

In some aspects of the embodiment, each sensor is a time-of-flight sensor.

In some aspects of the embodiment, each sensor is at least one of an IR sensor, a LIDAR sensor, and a laser sensor.

In some aspects of the embodiment, the at least one sensing location includes a plurality of sensing locations, and the gas cylinder storage cage includes a frame and a plurality of racks mounted within the frame, each of the plurality of racks including at least one of the plurality of sensing locations, each sensor being mounted on the frame.

In one embodiment, a gas cylinder cage monitoring system, the gas cylinder cage monitoring system includes: a gas cylinder storage cage, the gas cylinder storage cage including: a frame; and a rack within the frame, the rack defining a plurality of sensing locations; a gas cylinder positioned at at least one of the plurality of sensing locations, the gas cylinder including a base end and a top end, the top end having a collar extending a distance away from the top end, the gas cylinder being positioned at the at least one of the plurality of sensing locations in either a first orientation or a second orientation; a plurality of sensors, one of the plurality of sensors being at each of the plurality of sensing locations, each of the plurality of sensors being mounted within the frame proximate a one of the plurality of sensing locations, each being configured to measure a first distance from the base end of the gas cylinder when the gas cylinder is in the first orientation and to measure a second distance from the top end of the gas cylinder when the gas cylinder is in the second orientation, the first distance being less than the second distance; and a control system in communication with each of the plurality of sensors, each of the plurality of sensors being configured to transmit at least one of the first distance and the second distance to the control system, the control system being programmable to determine the gas cylinder at each of the plurality of sensing locations is full when the sensor transmits the first distance and to determine the gas cylinder at each of the plurality of sensing locations is empty when the sensor transmits the second distance, the control system being further programmable to: calculate a first number of gas cylinders positioned at at least one of the plurality of sensing locations that are full; calculate a second number of gas cylinders positioned at at least one of the plurality of sensing locations that are empty; and display the calculated first and second numbers on a graphical user interface.

In some aspects of the embodiment, each sensor includes a light emitter and a light receiver, the light emitter being configured to direct an amount of light toward the gas cylinder and the light receiver being configured to receive the amount of light when the amount of light is reflected from the gas cylinder.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
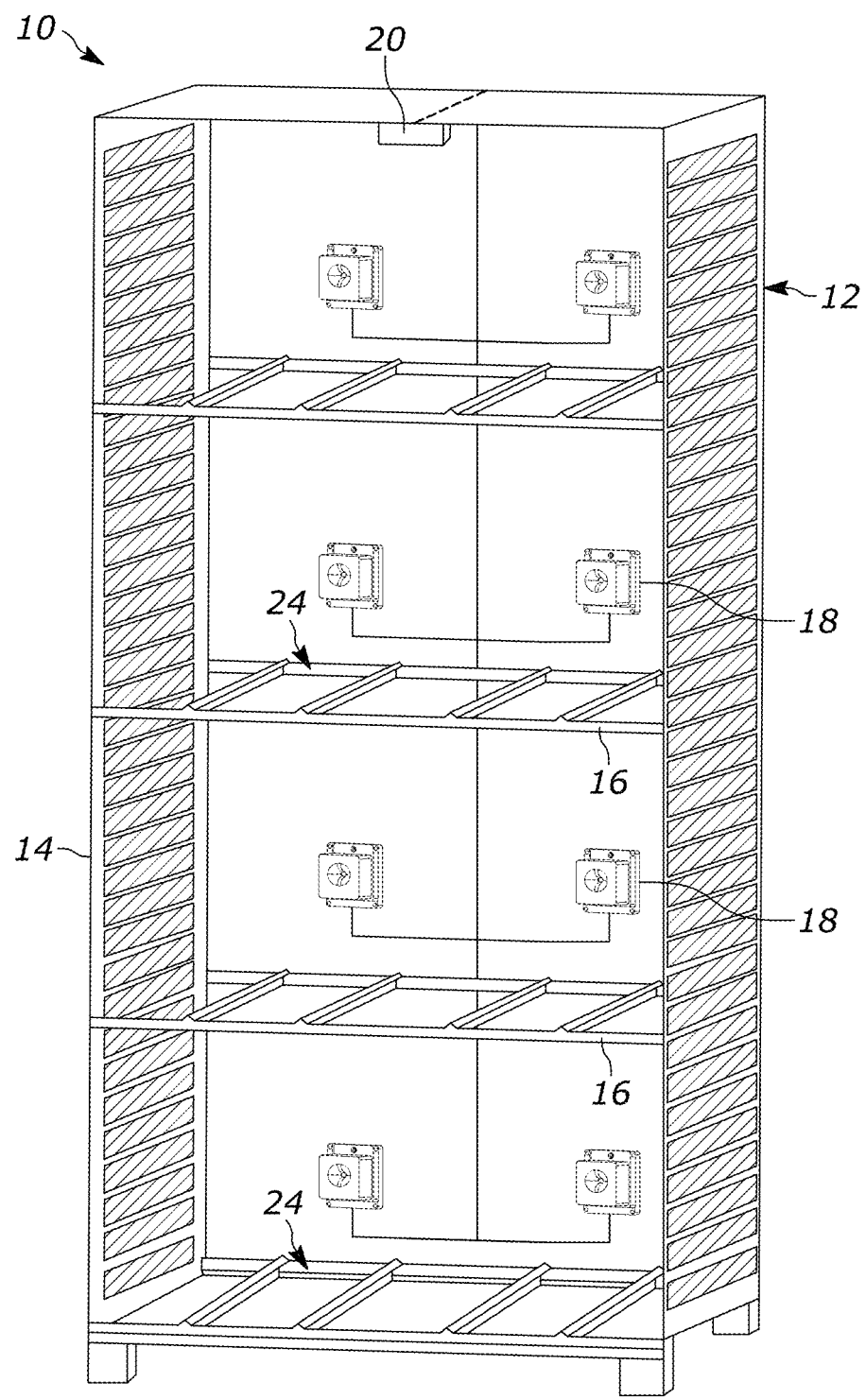
FIG. 1 shows an exemplary first embodiment of a cage monitoring system, in accordance with the present disclosure.

Before describing in detail exemplary embodiments, it is noted that system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Figure 2:
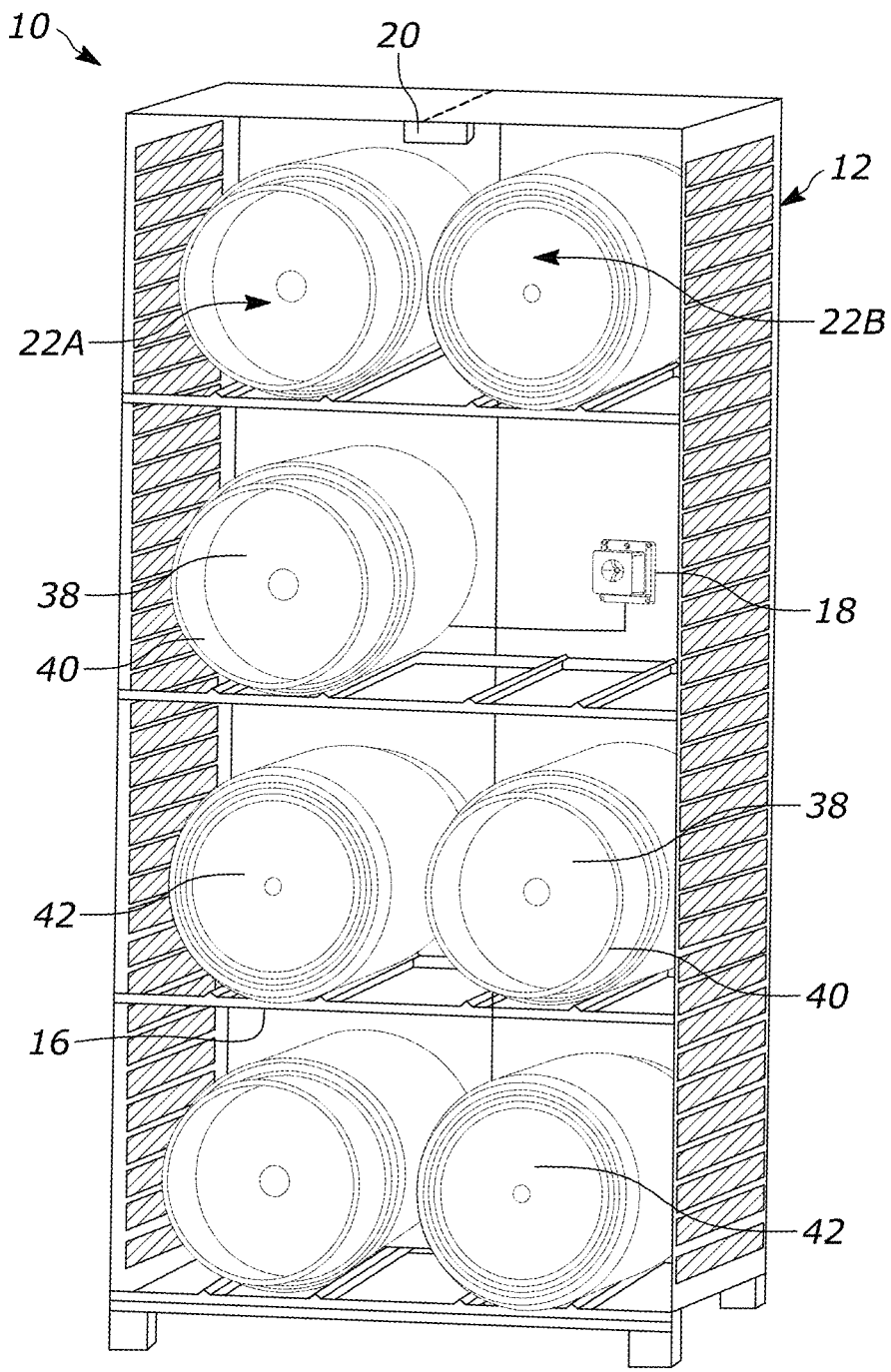
FIG. 2 shows the exemplary cage monitoring system of FIG. 1 with gas cylinders therein, in accordance with the present disclosure.

Referring now to the figures in which like reference designators are used for like elements, an exemplary cage monitoring system is shown in FIGS. 1 and 2. In one embodiment, the cage monitoring system 10 (also referred to herein as the "system" for simplicity) generally includes a gas cylinder storage cage 12 including a frame 14 and at least one rack 16. In some embodiments, the system 10 further includes a plurality of sensors 18 and a control system 20. In some embodiments, when at least one gas cylinder is placed inside the gas cylinder storage cage 12, the system 10 further includes the gas cylinder(s) 22.

Continuing to refer to FIGS. 1 and 2, in some embodiments the gas cylinder storage cage 12 is configured to sit, rest, be placed, and/or be mounted to a floor surface and/or to a horizontal and/or vertical surface in a way that provides stability to the gas cylinder storage cage 12. In one embodiment, each rack 16 is mounted or situated within the gas cylinder storage cage 12 such that the rack 16 is horizontal or at least substantially horizontal to provide a stable resting surface for at least one cylinder 22. In some embodiments, each rack 16 is configured to retain at least one cylinder 22 in a steady position and to prevent rolling, slipping, falling, and/or other dislodgement of the cylinder 22. For example, each rack 16 may include one or more lips, ledges, retaining elements, guide rails, or other features. In one embodiment, the gas cylinder storage cage 12 is composed of a rigid and inert material, such as metal, wood, rigid plastic, or other suitable material that is strong and heavy enough to support the gas cylinders 22 and to resist falling or toppling over.

Continuing to refer to FIGS. 1 and 2, in one embodiment, the gas cylinder storage cage 12 is configured to contain therein a plurality of gas cylinders 22. In one non-limiting example, the gas cylinder storage cage 12 is configured to contain up to twenty-four gas cylinders 22; however, it will be understood that a gas cylinder storage cage 12 may be configured to hold any number of gas cylinders 22. Regardless of the number of gas cylinders 22 that the gas cylinder storage cage 12 is configured to retain each gas cylinder 22 at a sensing location 24 proximate an associated sensor 18.

Continuing to refer to FIGS. 1 and 2, in some embodiments each of the plurality of sensors 18 is mounted, affixed, adhered, attached, integrated, secured, or otherwise positioned within the gas cylinder storage cage 12. In some embodiments, each of the plurality of sensors 18 is mounted at a location that is proximate one of the sensing locations 24. That is, each sensor 18 is positioned such that it can sense the presence or absence of a cylinder 22 in one sensing location 24, with each sensing location 24 having its own sensor 18. Thus, a signal received by the control system 20 from a sensor 18 will contain data about only one sensing location 24.

Figure 3:
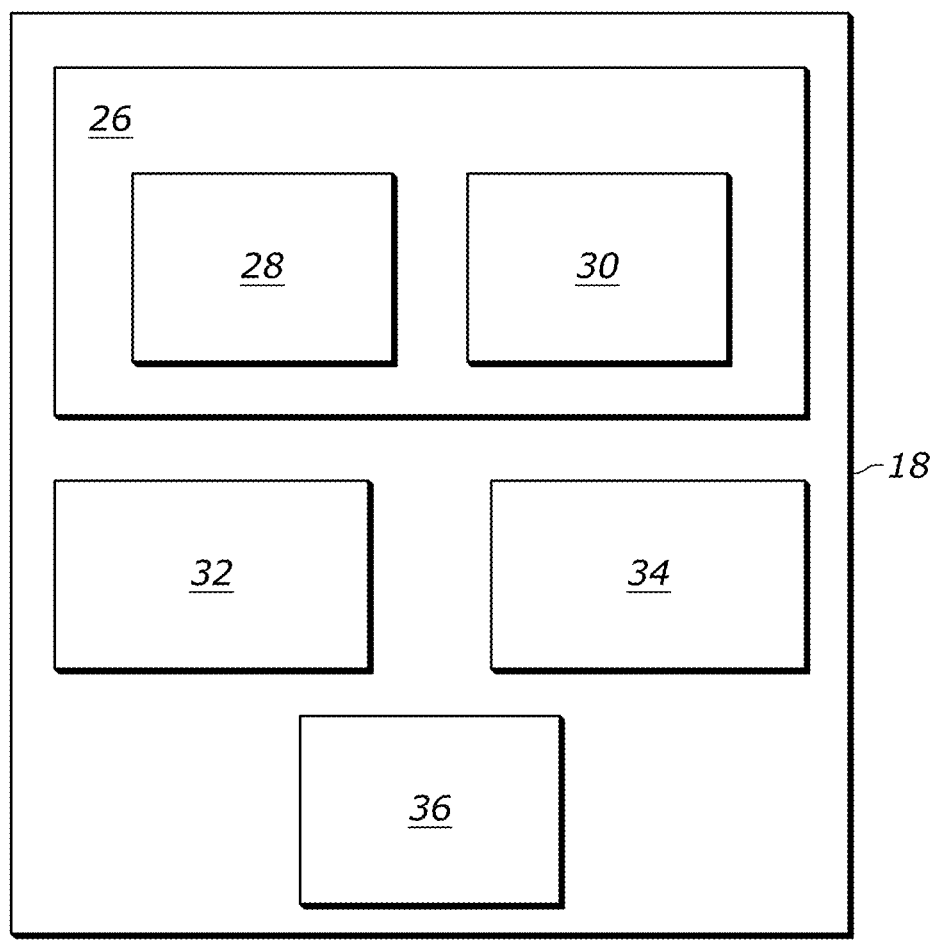
FIG. 3 shows a block diagram of an exemplary sensor of a cage monitoring system, in accordance with the present disclosure.

Continuing to refer to FIGS. 1 and 2, and with reference to FIG. 3, each sensor 18 is configured to measure a distance between an end of a cylinder 22 and the sensor 18 when a cylinder 22 is placed in the associated sensing location 24 within the gas cylinder storage cage 12. FIG. 3 shows a block diagram of one embodiment of a sensor. In one embodiment, each sensor 18 generally includes processing circuitry 26 (for example, a microprocessor) including a processor 28 and a memory 30. In one embodiment, each sensor 18 also includes a light emitter 32 and a light receiver 34. The components of the sensor 18 may be in wired and/or wireless communication with each other, with the control system 20, and/or with or more remote computers or storage devices. In some embodiments, each sensor 18 also includes a communications module 36 for wirelessly transmitting and/or receiving data from one or more other system components and/or remote computers or storage devices. In some embodiments, each sensor 18 also includes one or more inputs/outputs, hard wire connections (for example, LAN ports), power sources (for example, batteries) and/or power connections, and other components. The components of the sensor 18 are configured, programmed, and/or programmable to perform the sensor functions disclosed herein.

Figure 4:
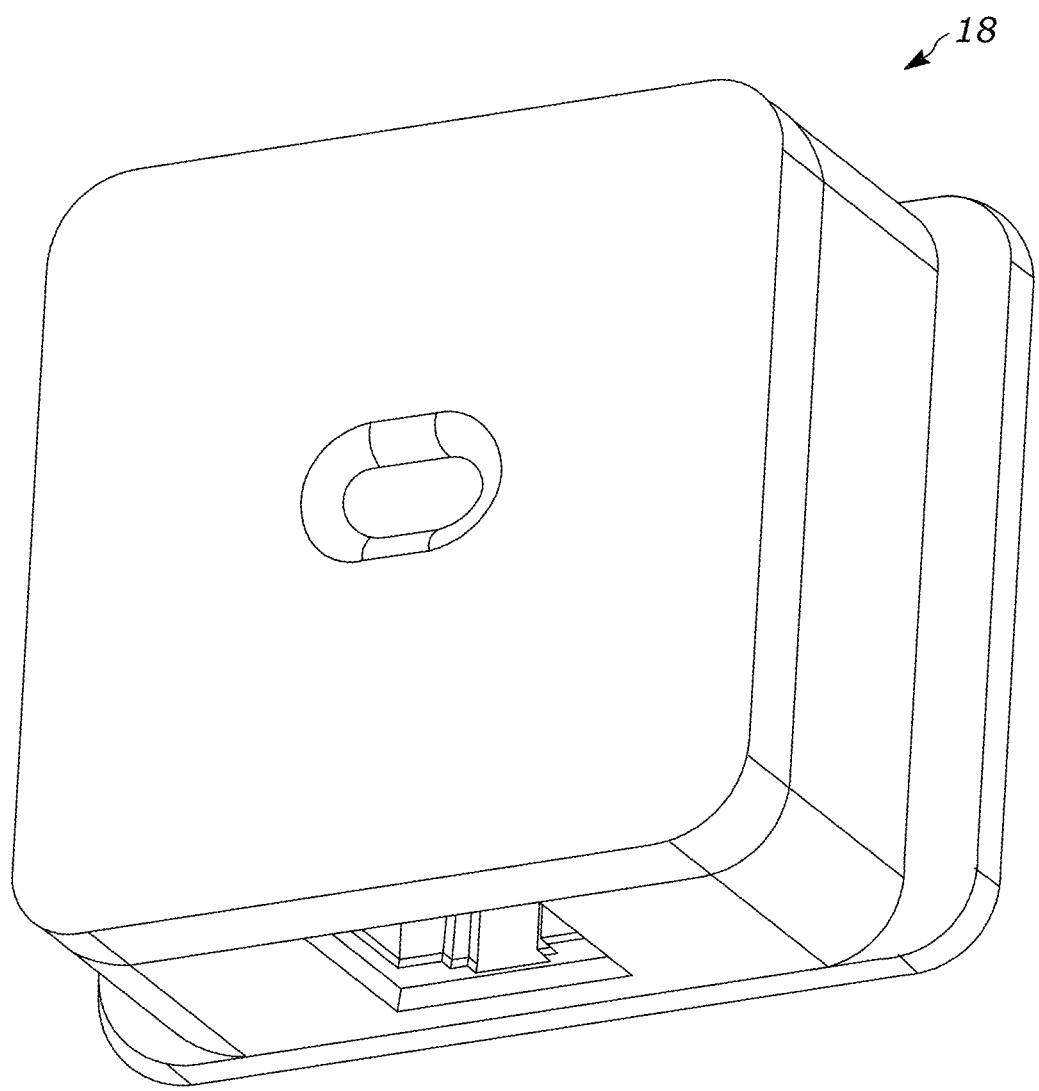
FIG. 4 shows a perspective view of an exemplary sensor of a cage monitoring system, in accordance with the present disclosure.

Continuing to refer to FIGS. 1 and 2, and with reference to FIGS. 3 and 4, in one non-limiting example, one or more of the sensors 18 is a "time-of-flight" sensor, such as an infrared (IR), light detection and ranging (LIDAR), laser distance sensor, and/or other light-based sensor that senses light and uses a time of return of light emitted by a light emitter associated or integrated with the sensor assembly, and received by a receiver associated or integrated with the sensor assembly, to calculate distance to an object. For example, in some embodiments, the emitter is configured to emit an amount of light (for example, one or more timed pulses of light) toward a gas cylinder, the receiver is configured to receive the amount of light that is reflected back to the sensor from the gas cylinder, and the sensor is configured to determine a length of time it takes for the amount of light to return to the receiver ("time data"). In some embodiments, this time data is transmitted from the sensor 18 to the control system 20, and the control system 20 is programmed or programmable to calculate a distance between the sensor 18 and the gas cylinder 22 based on the time data. In other embodiments, the sensor 18 includes a microprocessor that is programmed or programmable to calculate a distance between the sensor 18 and the gas cylinder 22 based on the time data, and then transmits the calculated distance data to the control system 20. In some embodiments, each sensor 18 is configured to sense light that is reflected from a distance of up to 20 cm away, although sensors capable of operating at distances greater than this may also be used. Further, in some embodiments, each sensor 18 is configured to sense light that is reflected from an object, and to calculate a time of return, regardless of the reflectance or color of the object. Still further, in some embodiments, each sensor 18 is configured to sense ambient light, and is operable in ultra-low light conditions. A non-limiting example of a sensor 18 configured for use in the system 10 disclosed herein is shown in FIG. 4.

In current industry standard use, full cylinders are placed within a storage cage with a collar end facing outward, whereas empty cylinders are placed within the storage cage with the collar end facing inward (toward the back wall of the storage cage). Thus, the system 10 allows a user to safely determine a status (for example, a fill status) of each cylinder without needing to measure the cylinder's weight or fuel level. Additionally, the sensors 18 are capable of detecting the presence of a cylinder 22, and determining whether that cylinder is full or empty, even if the gas cylinder storage cage 12 is not on absolutely level ground. For example, in some embodiments the light emitter 32 of the sensor 18 is configured to emit light toward the cylinder 22, receive light returned from the cylinder 22, calculate an amount of time it took the light to return to the light receiver 34, and determine a distance between the sensor 18 and the cylinder 22 based on the calculated amount of time.

For example, FIG. 2 shows a gas cylinder storage cage 12 with two cylinders 22 inside. A first cylinder 22A is placed in a first orientation on the rack 16, with a first end 38 with a collar 40 facing outward and a second end (base) 42 being proximate a sensor 18. This indicates the cylinder 22A is full. A second cylinder 22B is placed in a second orientation on the rack 16, with the second end 42 facing outward and the first end being proximate a sensor 18. This indicates the cylinder 22B is empty. The collar 40 extends from the first end 38 (top) of each cylinder 22, in a direction that is along the cylinder's longitudinal axis and away from the second end 42, and is configured to protect the valve and connectors. The first end 38 is opposite the second end 42. When a cylinder 22 is placed on a rack 16 in the first orientation at a sensing location 24, the sensor 18 measures a first distance between the sensor 18 and the second end 42 of the cylinder 22. When a cylinder 22 is placed on a rack 16 in the second orientation at a sensing location 24, the sensor 18 measures a second distance between the sensor 18 and the first end 38 of the cylinder 22, which second distance is greater than the first distance because the collar 40 causes the first end 38 of the cylinder 22 to be farther away from the sensor 18 than the second end 42 of the cylinder 22. Further, in some embodiments, the sensor 18 is configured to measure a distance between the first end 38 and the sensor 18, but not a distance between any portion of the collar 40 and the sensor 18. For example, the light emitter 32 associated with or integrated with the sensor assembly may be positioned such that no portion of the emitted light is emitted in a direction that will enable the light to be reflected from the collar 40. This may prevent a false distance measurement, wherein a distance from the collar 40, which may be closer to the sensor 18 than the first end 38 of the cylinder 22, would be small enough to be recognized by the system 10 as a distance between the second end 42 and the sensor 18 and falsely interpreted as a presence of a full cylinder 22.

Figure 5:
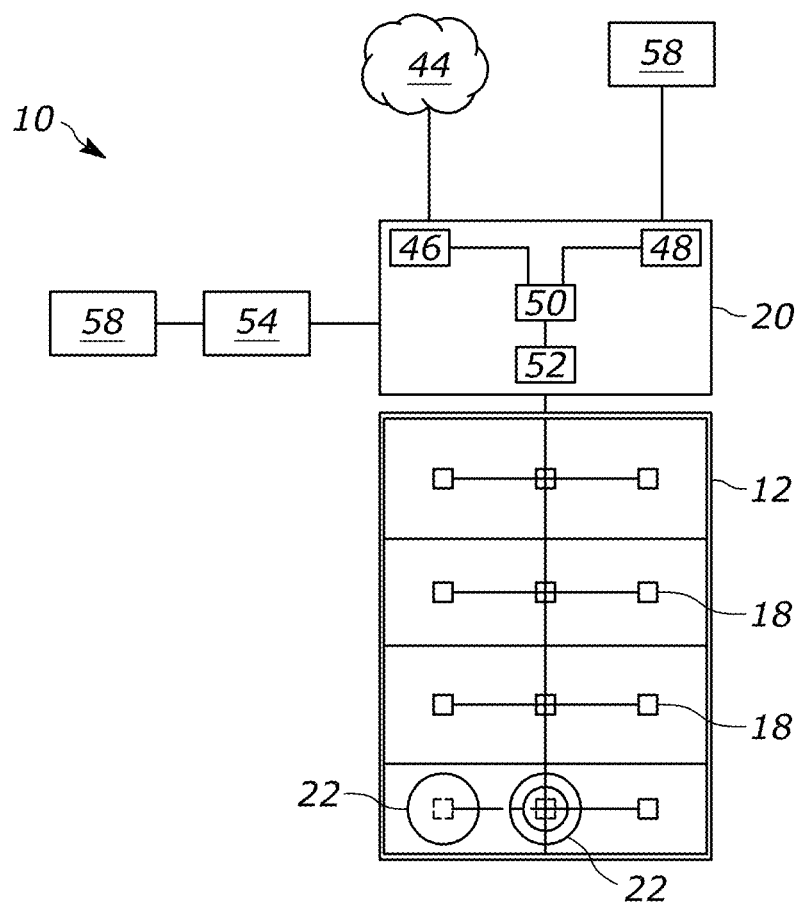
FIG. 5 shows a block diagram of an exemplary cage monitoring system, in accordance with the present disclosure.

Referring now to FIG. 5, a block diagram of an exemplary cage monitoring system 10 is shown. The system 10 generally includes a gas cylinder storage cage 12 and control system 20, as well as associated components and, in some embodiments, at least one cylinder 22. The gas cylinder storage cage 12 and control system 20 may be in wired or wireless communication with each other and/or to a cloud network 44 and/or remote computer(s), storage device(s), mobile device(s), control unit(s) of other gas cylinder storage cages, or other networks or devices (referred to herein as "external nodes").

Continuing to refer to FIG. 5, in one embodiment the control system 20 generally includes processing circuitry. In one embodiment, the processing circuitry includes a processor 46 and memory 48, which are in electrical communication with each other. In some embodiments, the processing circuitry may also include integrated circuitry for processing and/or control, for example, one or more processors and/or processor cores and/or FPGAs (Field Programmable Gate Array) and/or ASICs (Application Specific Integrated Circuitry). Processing circuitry may include and/or be connected to and/or be configured for accessing (for example, writing to and/or reading from) the memory 48, which may include any kind of volatile and/or non-volatile memory, including but not limited to cache, buffer memory, random access memory (RAM), read-only memory (ROM), optical memory, ternary content-addressable memory (TCAM), static random access memory (SRAM), and/or erasable programmable read-only memory (EPROM). Further, the memory may include one or more disks, tape drives, and/or solid-state drives and/or drives as outflow data storage devices, configured to store programs when such programs are selected for execution and to store instructions and data that are read during program execution. For example, such memory 48 may be configured to store code executable by control circuitry and/or other data, including data pertaining to communication. In one embodiment, the processing circuitry is configured to control any of the methods described herein and/or to cause such methods to be performed, for example, by the processor 46. Corresponding instructions may be stored in the memory 48, which may be readable and/or readably connected to the processing circuitry.

Continuing to refer to FIG. 5, in one embodiment the processor 46 is further electrically coupled to and in communication with a communication interface 50. In one embodiment, the communication interface 50 is coupled to, and configured to communicate (for example, send and/or receive data) via, an antenna 52. In some embodiments, the antenna 52 is configured for cellular, WiFi, RFID, and/or other suitable means for wireless communication to and/or from one or more external nodes. Additionally or alternatively, the communication interface 50 is configured to communicate via Ethernet or other suitable wired interface. For example, each of the plurality of sensors 18 may be in wired communication with the communication interface 50. In one embodiment, the processing circuitry further includes a control interface, such as a control interface operated on and/or displayed by a control interface 54. In one embodiment, the processing circuitry (for example, the processor 46) is coupled to and/or in communication with one or more of the plurality of sensors 18 and/or external nodes 58 via the control interface 54. In some embodiments, the communication interface 50 and/or the control interface 54 is configured to transmit and/or receive data and/or instructions from a user. For example, a user may activate and/or deactivate one or more sensors 18 of the system 10 remotely using an external node, such as a control device, computing device, mobile device, or the like. In one embodiment, the system 10 further includes a control interface 54 that is integrated with, mounted or affixed to, in direct communication with, or otherwise directly connected to (through a wired or wireless connection) the gas cylinder storage cage 12. In some embodiments, the control interface 54 includes one or more displays, touch screens, buttons, knobs, and/or other means for interaction with a user. In some embodiments, the control interface 54 further includes, for example, processing circuitry including memory, one or more storage devices or drives, and/or other components configured to temporarily and/or permanently store data received from the control system 20 and/or sensor(s) 18 and to display or communicate such data to a user (for example, through one or more displays or screens integrated with or in communication with the control interface 54).

Continuing to refer to FIG. 5, in one embodiment the control system 20 is configured to determine the presence or absence of at least one cylinder 22 placed within the gas cylinder storage cage 12, and to determine a status of each cylinder 22 (that is, whether each cylinder 22 is full or empty) based on data received from one or more sensors 18. In some embodiments, the control system is in communication with one or more external nodes 58 such as a computing device. The computing device may execute or be configured to execute one or more software programs, such as a software program for displaying system status data received from the control system 20 by the computing device (for example, as shown in FIG. 6).

Figure 6:
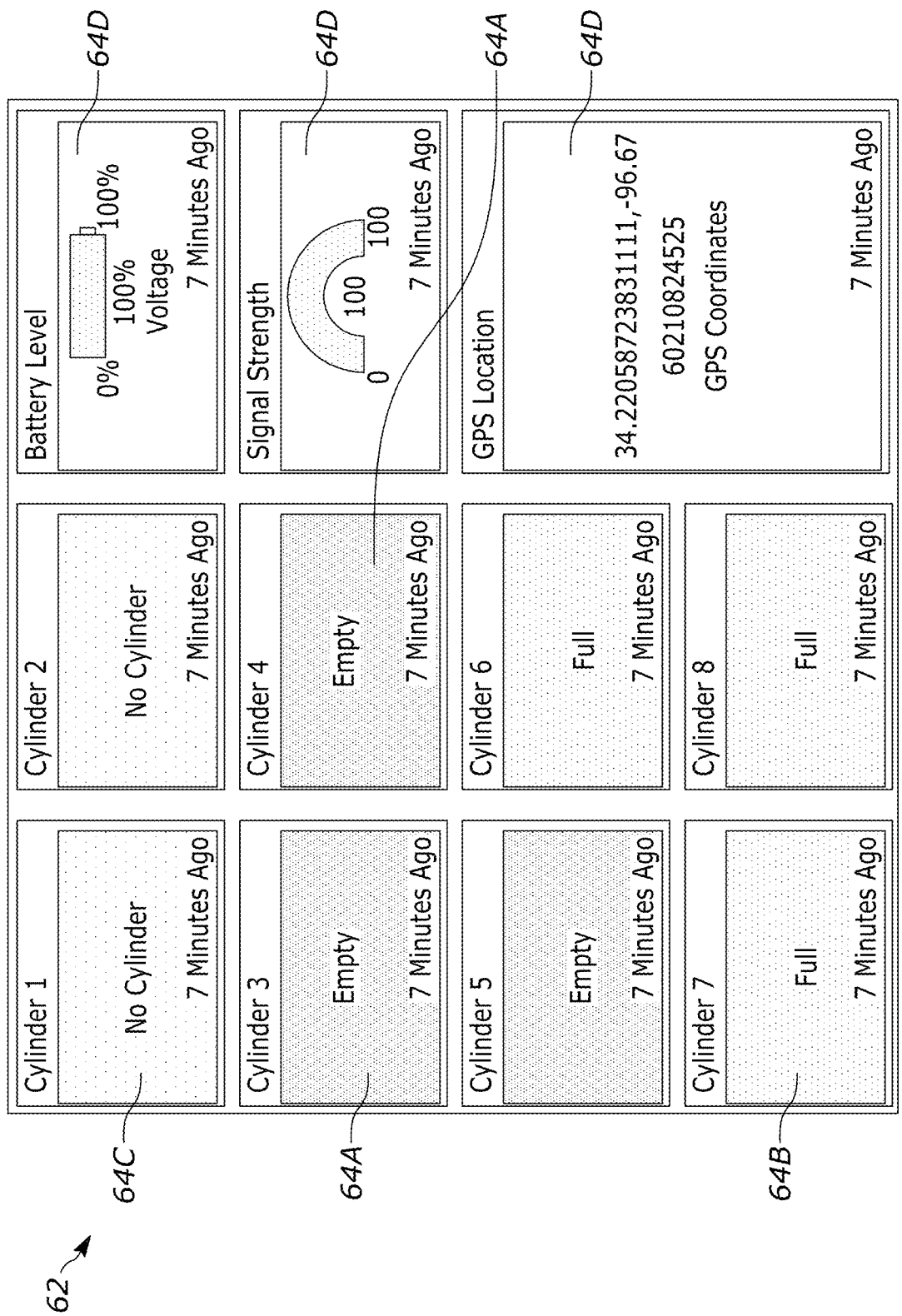
FIG. 6 shows an exemplary software interface for an exemplary cage monitoring system, in accordance with the present disclosure.

Referring now to FIG. 6, an exemplary software interface for the cage monitoring system is shown. In one embodiment, the software interface 62 is displayed by a software program executed by an external node, such as a computing device, and is used to communicate cylinder status data to a user and/or to receive instructions (for example, to display to a user a determination of how many cylinders 22 in the gas cylinder storage cage 12 are full and how many are empty, as well as identifying any sensing locations 24 from which a cylinder is absent). In one embodiment, the software interface 62 is displayed on or by the control interface 54 (for example, on a screen or computer display) in a graphical user interface. Additionally or alternatively, the software interface 62 is displayed on or by an external node 58, such as a computing device, tablet, mobile device, or the like.

Continuing to refer to FIG. 6, the software interface 62 is configured to communicate to a user one or more items of information about the system 10. In one embodiment, the software interface 62 displays one or more icons, tiles, text, colors, or the like for each sensing location 24. In one non-limiting example, a red square/tile 64A may be displayed for any sensing location 24 having an empty cylinder 22, a green square/tile 64B may be displayed for any sensing location 24 having a full cylinder 22, and a yellow or white square/tile 64C may be displayed for any sensing location 24 from which a cylinder 22 is absent. However, it will be understood that other mechanisms for communicating system information to a user may be used, including colors, shapes, icons, and/or indicia other than that disclosed herein. In one embodiment, the software interface 62 is also configured to, at the user's preference, display one or more additional squares/tiles 64D that indicate a battery charge level of each sensor 18 and/or other system component, a signal strength of each sensor 18 and/or other system component, a signal strength between the control system 20 and a remote node, a strength of a signal received by the control system 20 (for example, a GPS, cellular, WiFi, or other means for data communication), a system component malfunction warning or alert, and/or other data or operational or maintenance information. Other system status indicators that may also be displayed, include, but are not limited to, fluid detection, detected gas leaks, available software and/or firmware updates, and others. The software interface 62 allows a user to quickly and easily see the status of all cylinders and the system itself and/or to interact with or send instructions to the gas cylinder storage cage 12 and/or sensors 18.

Figure 7:
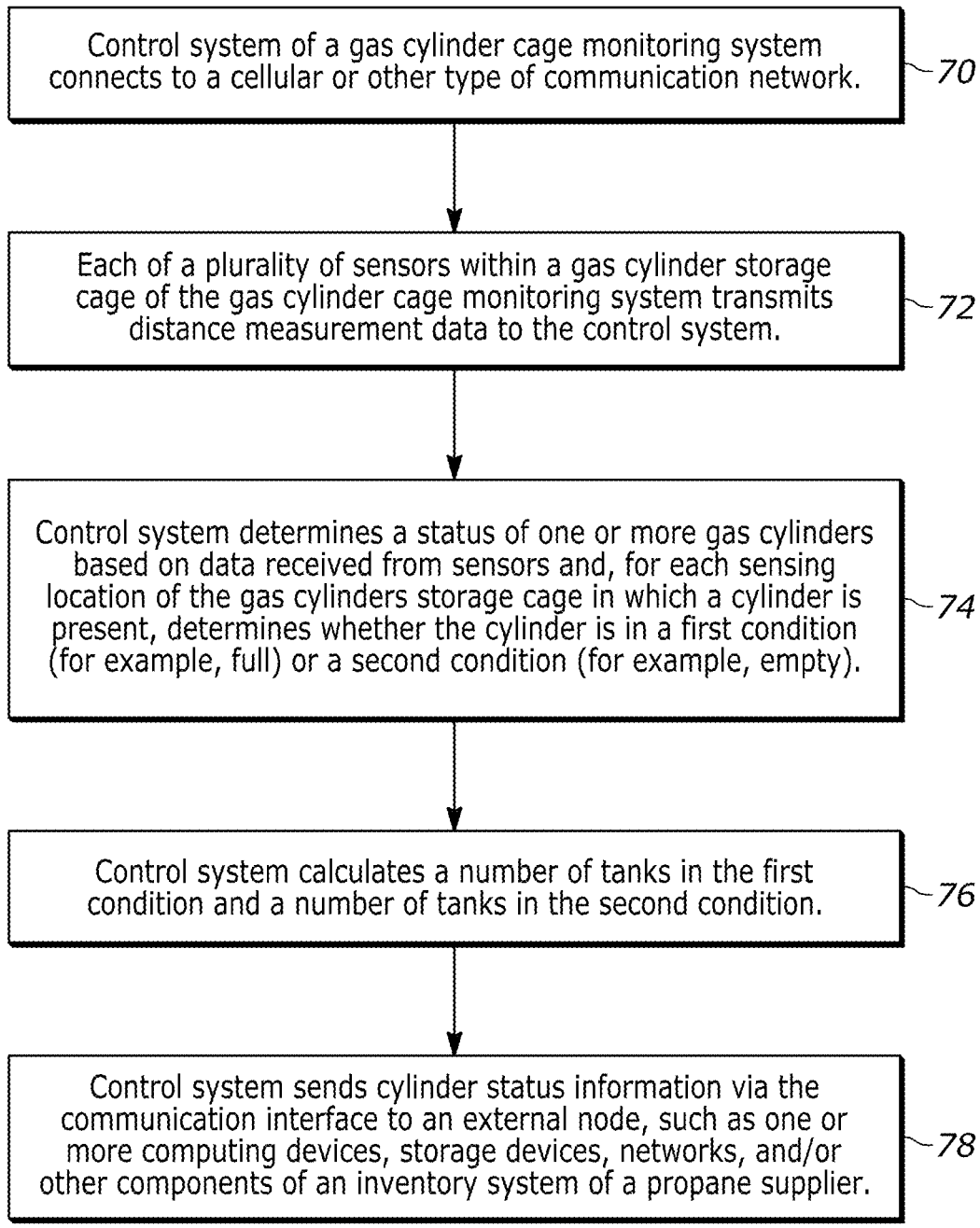
FIG. 7 shows an exemplary method of use of an exemplary cage monitoring system, in accordance with the present disclosure.
Figure 8:
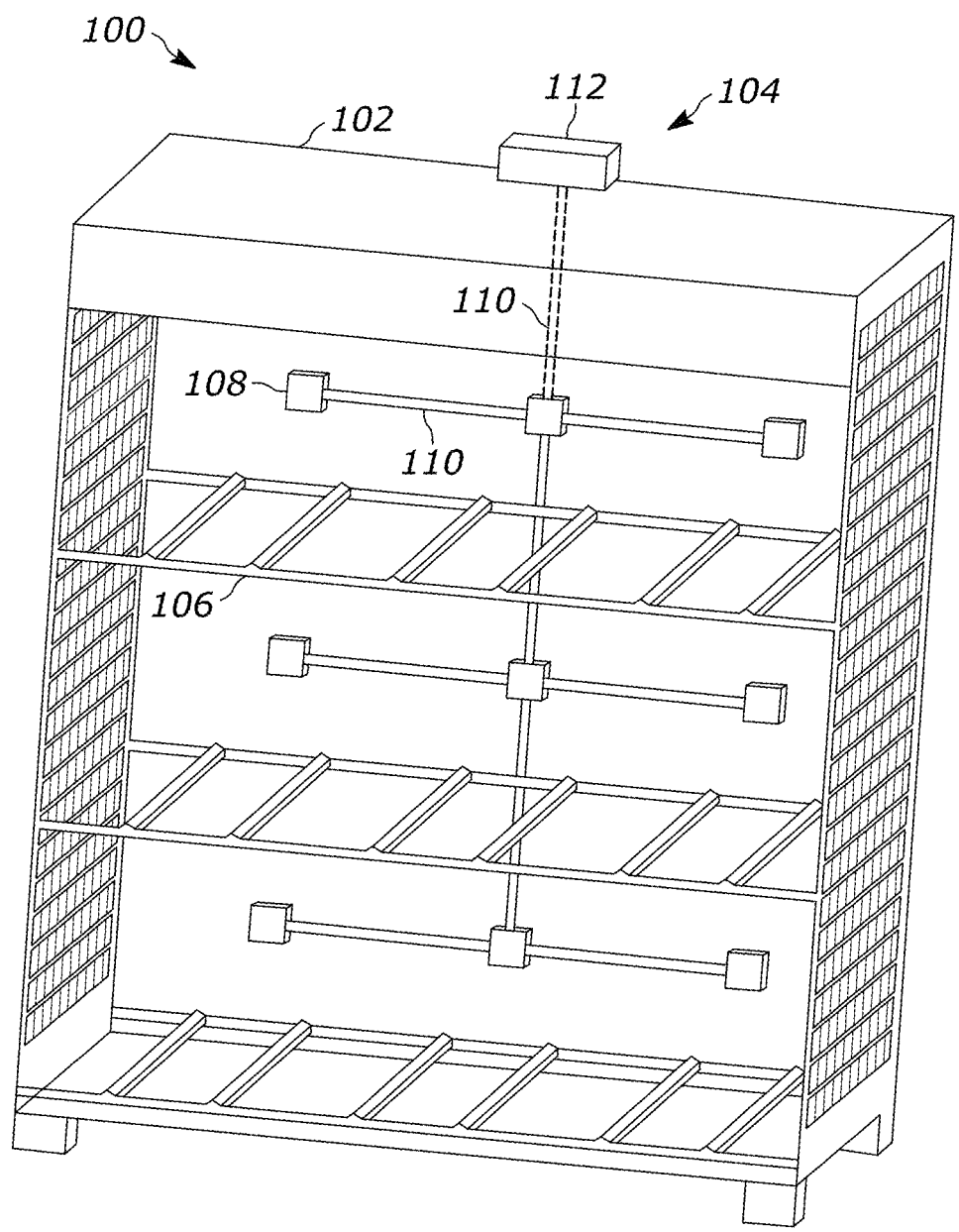
FIG. 8 shows a first view of a second embodiment of a cylinder storage cage and a monitoring system, in accordance with the present disclosure.

Referring now to FIG. 7, an exemplary method of use of an exemplary cage monitoring system is shown. In a first step 70, the control system 20 connects to a cellular or other type of communication network. In one embodiment, the first step 70 is performed in response to a timer of the control system 20 and/or to an external signal received via the communication interface 50 and/or the control interface 54. However, in some embodiments the first step 70 is not performed and the system 10 does not connect to a communication network. For example, the first step 70 may be omitted if a communication network is unavailable (the control system 20 may record and temporarily store data and later transmit to one or more remote nodes at a later time, once a communication network connection is available). In another example, the first step 70 may be omitted if the control system 20 is connected via wired connection to a control interface 54 that is directly connected to or integrated with the gas cylinder storage cage 12, such that a communication network connection is not needed.

Continuing to refer to FIG. 7, in a second step 72, each of the plurality of sensors 18 within the gas cylinder storage cage 12 transmit distance measurement data to the control system 20. In a third step 74, the control system 20 determines a status of one or more of the gas cylinders 22 based on data received from the sensors 18 and, for each sensing location 24 in which a cylinder 22 is present, determines whether the cylinder 22 is in a first condition (for example, full) or a second condition (for example, empty). In one embodiment, this determination is made based on data received by the control system 20 from each of a plurality of sensors 18. For example, if a sensor 18 does not detect a cylinder 22 at a sensing location 24 within the sensor's measurement distance, this lack of measurement data is communicated from the sensor 18 to the control system 20, and the control system 20 determines a cylinder 22 is absent at that sensing location 24. Conversely, if the sensor 18 does detect a cylinder 22 at a sensing location within the sensor's measurement distance, the presence of data is communicated from the sensor 18 to the control system 20, and the control system 20 determines a cylinder 22 is present that that sensing location 24.

Continuing to refer to FIG. 7, in a fourth step 76, the control system 20 calculates a number of tanks in the first condition and a number of tanks in the second condition. In one embodiment, this determination is made based on data received by the control system 20 from each of a plurality of sensors 18. For example, for each sensor 18 that has communicated a presence of a cylinder 22, that sensor 18 also communicates a measured distance between the cylinder 22 and the sensor 18. If the sensor 18 measures a first distance that is within a threshold distance between a second end 42 of the cylinder 22 and the sensor 18 and communicates that distance to the control system 20, the control system 20 determines the cylinder 22 is within the sensing location 24 in a first or full condition. If, on the other hand, the sensor 18 measures a second distance that is greater than the first distance and within a threshold distance between a first end 38 of the cylinder 22 and the sensor 18 and the sensor 18 communicates that distance to the control system 20, the control system 20 determines the cylinder 22 is within the sensing location 24 in a second or empty condition. As discussed above, the distance between the first end 38 of the cylinder 22 and the sensor 18 will be greater than the distance between the second end 42 of the cylinder 22 and the sensor 18 because the collar 40 is positioned between the first end 38 and the sensor 18.

Continuing to refer to FIG. 7, in a fifth step 78, the control system 20 sends cylinder status information via the communication interface 50 to an external node, such as one or more computing devices, storage devices, networks, and/or other components of an inventory system of a propane supplier. Thus, the control system 20 determines cylinder status information for each sensing location 24. Cylinder status information includes whether a cylinder 22 is present or absent in each sensing location 24 and, if present, whether the cylinder 22 is in a first condition or a second condition (full or empty). This status information about each cylinder 22, and of the entire system 10, may then be displayed by an external node, such as by the software interface 62 (for example, as shown in FIG. 6).

It will be understood that the method of FIG. 7 may include more or fewer steps than those shown and described. For example, the fifth step 78 may be optional, such as in embodiments wherein a control interface 54 is integrated with, mounted or affixed to, in direct communication with, or otherwise directly connected to the gas cylinder storage cage 12 and that is configured to directly display or communicate data (for example, cylinder status information) to the user without the need of transmitting through an external node 58. Additionally, in some embodiments the method also includes such additional steps as: generating (for example, by the control system 20) an alert to the user when the control system 20 determines that a status of at least one gas cylinder 22 is "empty"; automatically or semi-automatically contacting (for example, through the communication interface 50) a gas supplier to schedule a refill of any gas cylinders 22 for which the control system 20 determines has a status of "empty"; enabling (for example, through the control interface 54) a reset of one or more sensors 18; automatically cycling through a fault checking operation, search for available software or firmware updates, and/or other maintenance checks or operations upon power-up, at one or more designated times or time intervals, when requested by a user, or at other times during operation; and/or other automatic, semi-automatic, or manual optional steps.

Figure 10:
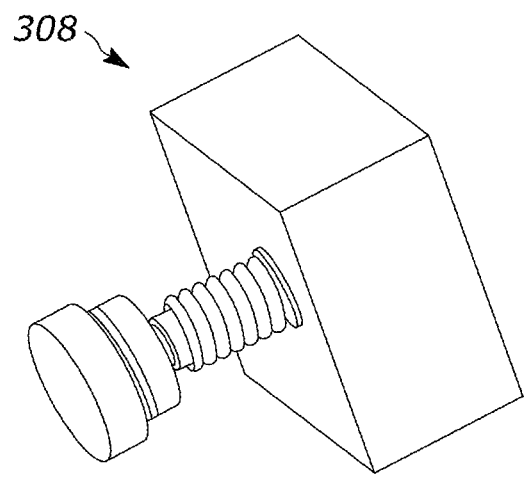
FIG. 10 shows a contact-sensitive switch suitable for use in a cylinder storage cage monitoring system, in accordance with the present disclosure.
Figure 11:
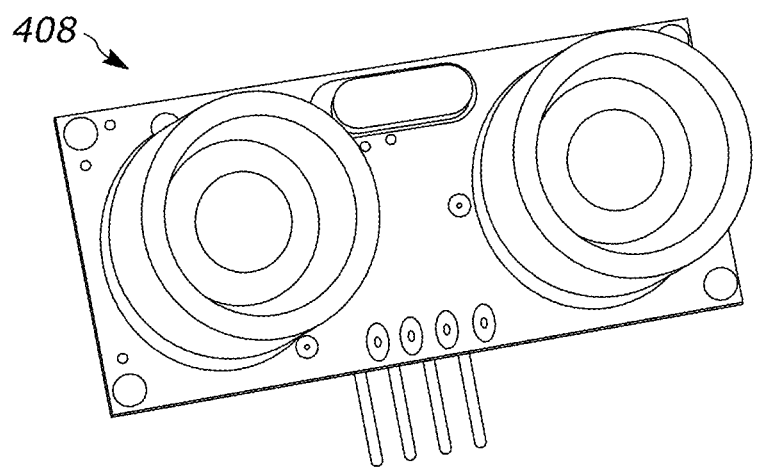
FIG. 11 shows a proximity sensor suitable for use in a cylinder storage cage monitoring system, in accordance with the present disclosure.
Figure 12:
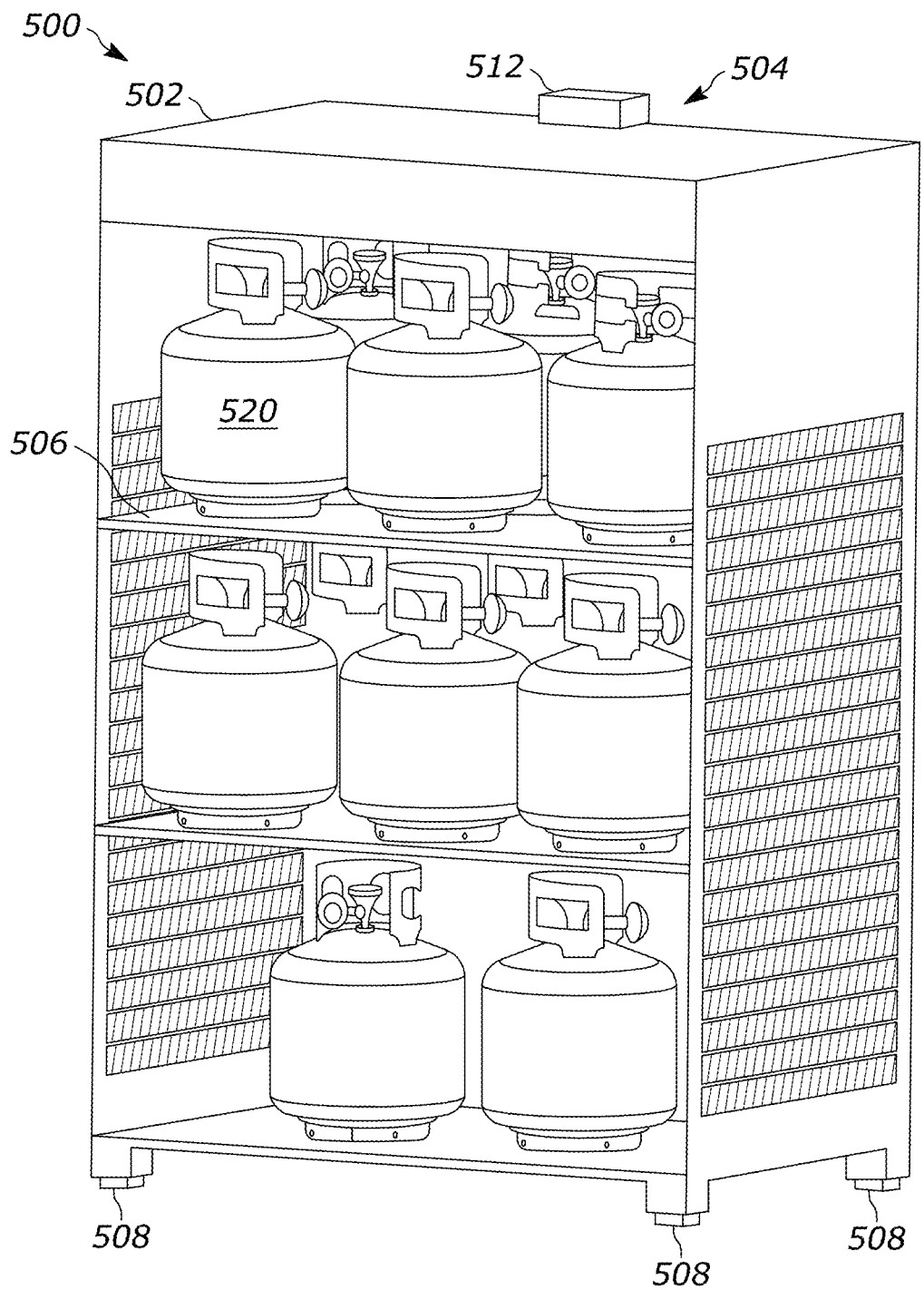
FIG. 12 shows a view of a third embodiment of a cylinder storage cage and a monitoring system, in accordance with the present disclosure.

Referring now to FIGS. 8-14, a second embodiment 100 of a cylinder storage cage 102 and a monitoring system 104 is shown in FIGS. 8-11 and a third embodiment 500 of a cylinder storage cage 502 and a monitoring system 504 is shown in FIG. 12. The cylinder storage cage 102 of FIGS. 8 and 9 includes cylinder racks 106, configured to support removeable cylinders such as the cylinders 22 in FIG. 2, or tanks 220 and 222 of FIG. 9 or tanks 520 of FIG. 12. As used herein, the terms "tank" and "cylinder" may be used interchangeably. In one embodiment, in FIG. 12, the tanks 520 are of a different size than the cylinders 22 of FIG. 2 and the tanks 220 and 222 of FIG. 9 and are placed upright on racks 506 of the cylinder storage cage 502. The monitoring systems 104 and 504 include sensors 108, 508.

Figure 9:
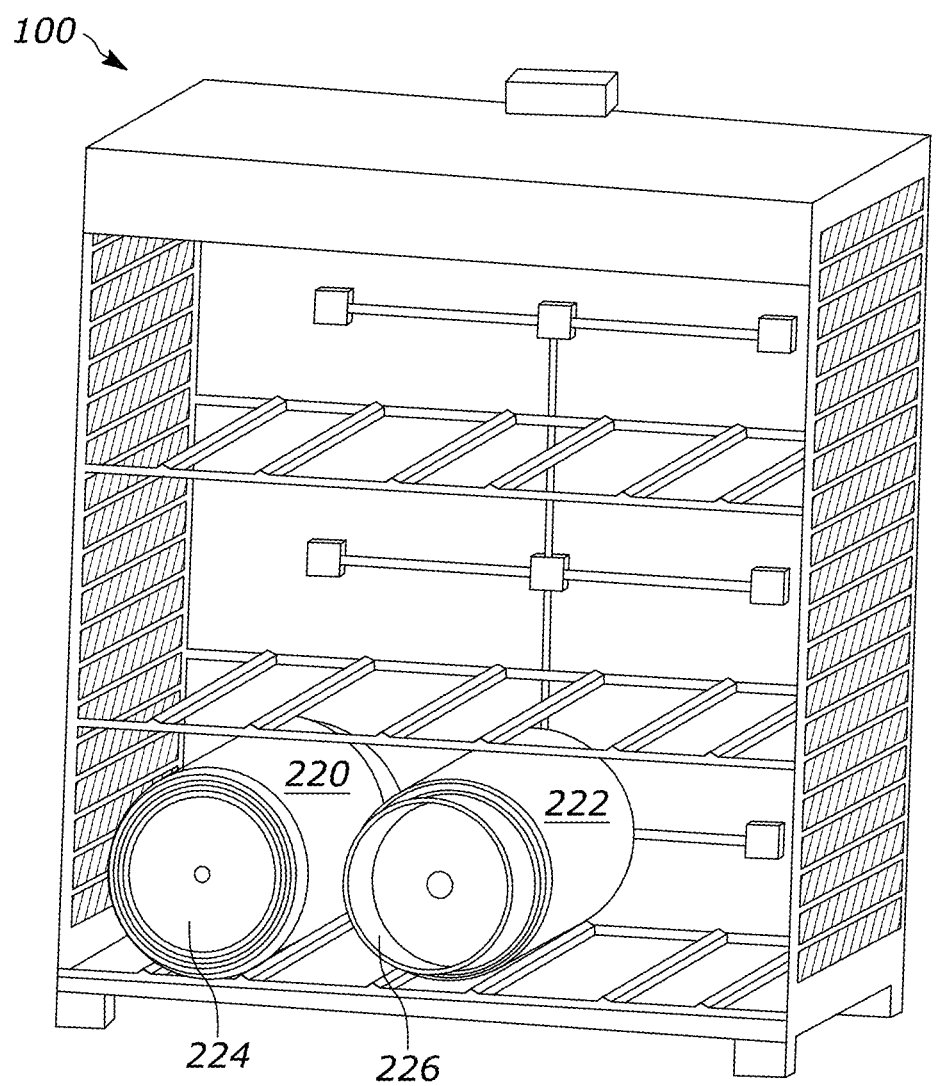
FIG. 9 shows a second view of the second embodiment of the cylinder storage cage and monitoring system of FIG. 7, in accordance with the present disclosure.

Referring to FIGS. 8-11, in some embodiments, the sensors 108 are contact-sensitive switches such as spring-loaded pushbutton switch 308 of FIG. 10 or other suitable contact-sensitive or pressure switch. In other embodiments, the sensors 108 are non-contact proximity sensors such as ultrasonic sensor 408 of FIG. 11 or other suitable non-contact proximity sensors. In some embodiments, the ultrasonic sensor 408 is a time-of-flight sensor that is configured to calculate distance based on the time of return of an ultrasonic pulse (as an echo returning from a target in the sensor's field of view. This is in contrast to the sensors 18 of the system 10 of FIGS. 1-7, which are light-based time-of-flight distance sensors. In some such embodiments, the sensors 108 may be infrared sensors or radio frequency identification (RFID) sensors configured to sense an RFID tag attached to the removeable tanks. Referring to FIG. 12, in some embodiments the monitoring system 504 includes load sensors (or strain gauges) 508 on the feet of the cylinder storage cage 502, the load sensors 508 being coupled by wires (not shown in FIG. 12) to a controller 512. In some embodiments, the controller 512 is configured to determine a weight status of one or more of the load sensors 508, the weight status indicating a weight of the cylinder storage cage 502 and any tanks 520 in the cylinder storage cage 502. From this weight status, the controller 512 is configured to determine a number of empty tanks and a number of full tanks in the cylinder storage cage 502. In other such embodiments, a load sensor 508 is located under each individual tank storage location and configured to sense the absence or presence (and, if present, full or empty) status of a single tank, and the controller 512 is configured to determine a weight status of each individual load sensor 508.

Referring to FIG. 9, in some embodiments the tank 220 is placed in a first orientation on the cylinder rack 106, with a top end toward a corresponding one of the sensors 108, indicating that the tank 220 is empty. The tank 222 is placed in a second orientation on the cylinder rack 106, with a bottom end 224 toward a corresponding one of the sensors 108, indicating that the tank 222 is full. Extending from the top end of each of the tanks 220 and 222 is a collar 226 that protects valves and connectors (not shown in FIG. 2) that attach to the top end of the tank. Because of the collar 226, the top end of the tank 220 is not sensed by its corresponding sensor 108, while the bottom end of the tank 222 is sensed by its corresponding sensor 108. In some embodiments, the sensor 108 is further capable of sensing whether there is no tank present on its corresponding portion of the cylinder rack 106. The controller 112 is configured to determine, via the wires 110, a status of each sensor 108, the status indicating the absence of a tank, the presence of a tank in the first orientation, or the presence of a tank in the second orientation.

Referring to FIG. 10, a contact sensitive switch 308 suitable for use in a cylinder storage cage monitoring system is shown. Referring to FIG. 11, a proximity sensor 408 suitable for use in a cylinder storage cage monitoring system is shown. In some embodiments, proximity sensor 408 includes both a transducer and a receiver.

Figure 13:
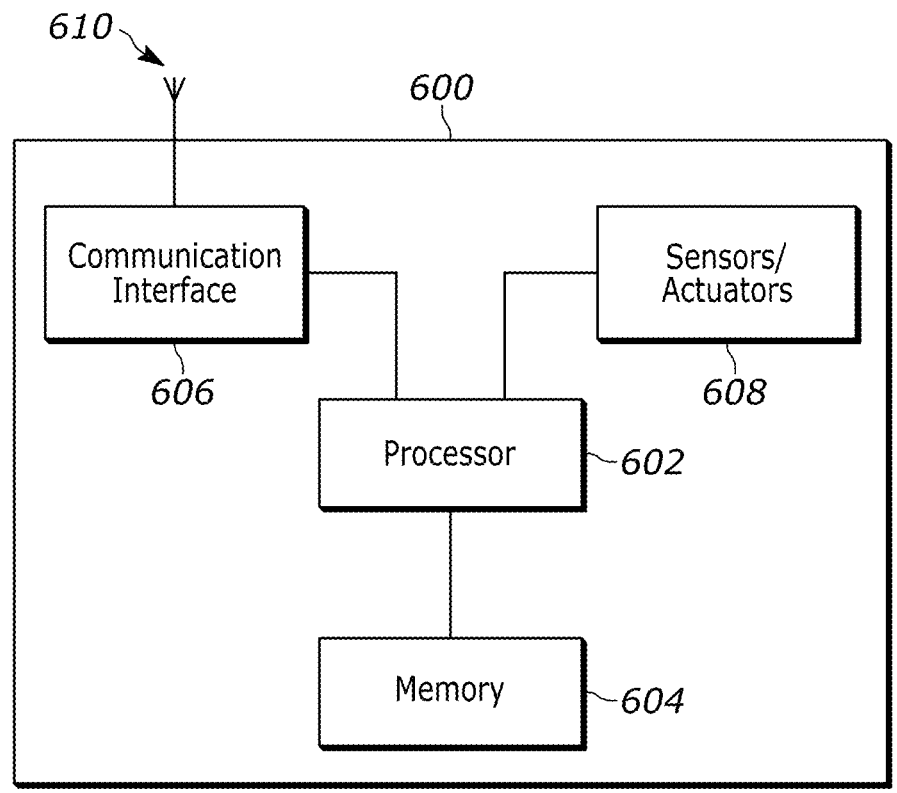
FIG. 13 shows a block diagram of a control system for a cylinder storage cage monitoring system, in accordance with the present disclosure.

Referring to FIG. 13, a block diagram of a control system 600 for a cylinder storage cage monitoring system of any of FIGS. 8-12 is shown. The control system 600 is configured to perform the method 700 described with reference to FIG. 14 and for implementing the controller 112 of FIG. 8 or the controller 512 of FIG. 12. In one embodiment, the control system 600 includes a processor 602 electrically coupled to a memory 604. The processor 602 is implemented by hardware and software. The processor 602 may be implemented as one or more Central Processing Unit (CPU) chips, cores (e.g., as a multi-core processor), field-programmable gate arrays (FPGAs), application specific integrated circuits (ASICs), and digital signal processors (DSPs).

Continuing to refer to FIG. 13, in some embodiments the processor 602 is further electrically coupled to and in communication with a communication interface 606. The communication interface 606 is coupled to, and configured to communicate via, an antenna 610. In various embodiments, the antenna 610 is configured for cellular, WiFi, RFID, or other suitable wireless communication. In other embodiments, the communication interface 606 is configured to communicate via Ethernet or other suitable wired interface. The processor 602 is also coupled via a control interface 608 to one or more sensors and/or other devices. In some embodiments, the control system 600 is configured to determine and report a number of empty tanks and a number of full tanks in a cylinder storage cage monitoring system according to the disclosure, and other functionality as disclosed herein. Such control may be implemented as instructions stored in the memory 604 and executed by the processor 602. The memory 604 may be volatile and/or non-volatile and may be read-only memory (ROM), random access memory (RAM), ternary content-addressable memory (TCAM), and/or static random-access memory (SRAM). The memory 604 may comprise one or more disks, tape drives, and/or solid-state drives and may use such disks and drives as overflow data storage devices, to store programs when such programs are selected for execution, and to store instructions and data that are read during program execution.

Figure 14:
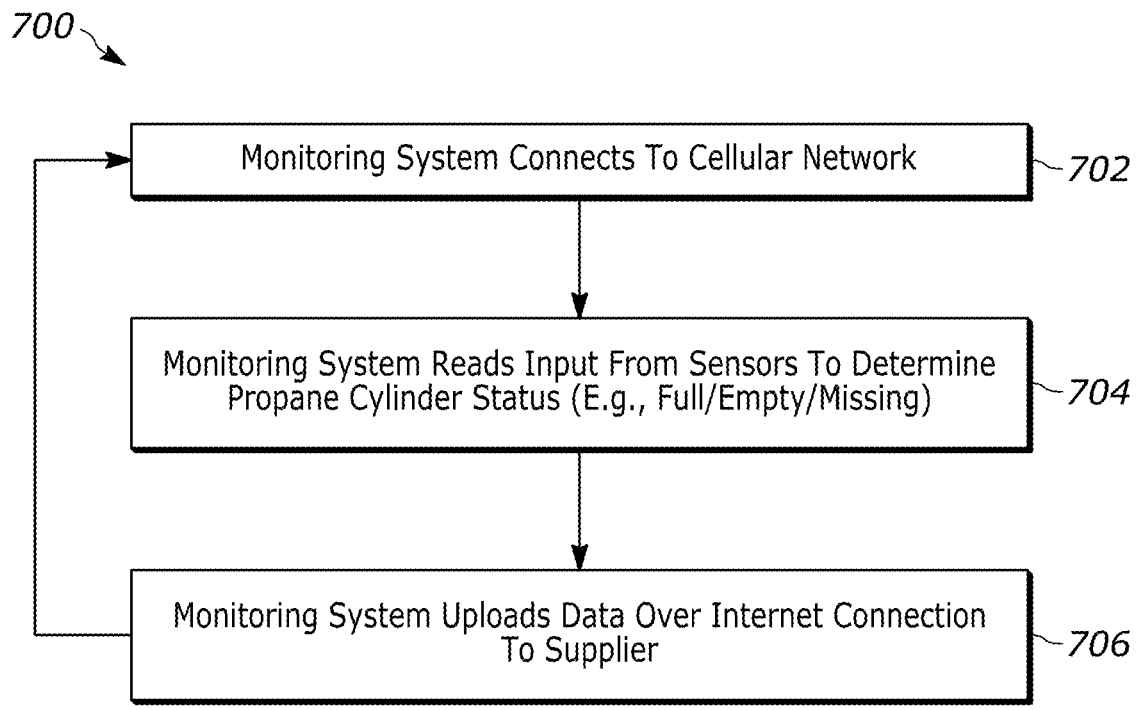
FIG. 14 shows a flow chart of a method for operating a cylinder storage cage monitoring system, in accordance with the present disclosure.

Referring to FIG. 14, a flow chart of a method 700 for operating a cylinder storage cage monitoring system of any of FIGS. 8-13 is shown. In step 702, the control system 600 connects to a cellular or other type of network. Step 702 may be performed in response to a timer of the control system 600 or to an external signal received via the communication interface 606 and/or the control interface 608. In step 704, the control system 600 determines a status of one or more sensors 108 and/or 508 and calculates a number of empty tanks and a number of full tanks in the cylinder storage cage 102 or 502. In step 706, the control system 600 sends information relating to the number of empty tanks and full tanks via the communication interface 606 to an external system, such as an inventory system of a propane supplier.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an," and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It should be understood that various aspects disclosed herein may be combined in different combinations than the combinations specifically presented in the description and the accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, sensing the presence or absence, or fill status, of one or more gas cylinders within a gas cylinder storage cage.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer.

Instructions may be executed by one or more processors, such as one or more digital signal processors (DSPs), general purpose microprocessors, application-specific integrated circuits (ASICs), field programmable logic arrays (FPGAs), or other equivalent or integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A method of monitoring gas cylinder storage, the method comprising:
   transmitting distance measurement data from a sensor within a gas cylinder storage cage to a control system of a cage monitoring system;
   determining, with the control system, whether a gas cylinder is present at a sensing location within the gas cylinder storage cage proximate the sensor based on the distance measurement data, the control system determining that a gas cylinder is present at the sensing location within the gas cylinder storage cage when the sensor measures a distance between the sensor and the gas cylinder; and
   when the control system determines that a gas cylinder is present at the sensing location, determining, with the control system, whether the gas cylinder is full or empty based on the distance measurement data, the distance measurement data including a distance between the sensor and the gas cylinder.

2. The method of claim 1, wherein the sensor is configured to:
   emit an amount of light toward the gas cylinder;
   receive the amount of light, the light being reflected from the gas cylinder; and
   determine an amount of time it takes for the amount of light to be reflected by the gas cylinder and to return to the sensor.

3. The method of claim 2, wherein the sensor is a time-of-flight sensor.

4. The method of claim 2, wherein the sensor is at least one of an IR sensor, a LIDAR sensor, and a laser sensor.

5. The method of claim 2, wherein the step of determining, with the control system, whether the gas cylinder is full or empty includes calculating a distance between the sensor and the gas cylinder based on the amount of time it takes for the amount of light to be reflected by the gas cylinder and to return to the sensor.

6. The method of claim 1, further comprising displaying on a display at least one item of information about the control system, the at least one item of information including:
   a presence or absence of the gas cylinder at the sensing location; and
   a fill status of the gas cylinder at the sensing location.

7. The method of claim 6, wherein the at least one item of information further includes:
   a wireless signal strength; and
   a battery charge level;
   a system component malfunction warning.

8. A system, the system comprising:
   a gas cylinder storage cage;
   at least one sensing location within the gas cylinder storage cage;
   a sensor mounted within the gas cylinder storage cage at each of the at least one sensing location; and
   a control system in communication with each sensor, wherein each sensor is configured to measure a distance from a gas cylinder and the sensor when a gas cylinder is positioned within the gas cylinder storage cage at one of the at least one sensing location, each sensor being further configured to transmit the distance to the control system as distance data.

9. The system of claim 8, wherein the sensor is one of an ultrasonic sensor and a contact-sensitive switch.

10. The system of claim 8, wherein the gas cylinder is positioned within the gas cylinder storage cage at the one of the at least one sensing location.

11. The system of claim 10, wherein the gas cylinder includes a first end, a second end opposite first end, and a collar at the first end, the collar extending from the first end in a direction that is opposite the second end.

12. The system of claim 11, wherein each sensor is configured to:
   measure a distance from the first end of the gas cylinder to the sensor when the first end of the gas cylinder is proximate the sensor, and to not measure a distance from any portion of the collar to the sensor when the first end of the gas cylinder is proximate the sensor; and
   measure a distance from the second end of the gas cylinder to the sensor when the second end of the gas cylinder is proximate the sensor.

13. The system of claim 12, wherein each sensor includes a light emitter and a light receiver, the light emitter being configured to direct an amount of light toward the gas cylinder and the light receiver being configured to receive the amount of light when the amount of light is reflected from the gas cylinder.

14. The system of claim 10, wherein the control system includes a processor and a memory that are programmable to calculate a fill status of the gas cylinder based on the distance data.

15. The system of claim 14, wherein the processor and memory are programmable to determine that:
the gas cylinder is full when the distance data indicates the gas cylinder is a first distance from the sensor; and
the gas cylinder is empty when the distance data indicates the gas cylinder is a second distance from the sensor, the second distance being greater than the first distance.

16. The system of claim 10, wherein each sensor is a time-of-flight sensor.

17. The system of claim 16, wherein each sensor is at least one of an IR sensor, a LIDAR sensor, and a laser sensor.

18. The system of claim 8, wherein the at least one sensing location includes a plurality of sensing locations, and the gas cylinder storage cage includes a frame and a plurality of racks mounted within the frame, each of the plurality of racks including at least one of the plurality of sensing locations, each sensor being mounted on the frame.

19. A gas cylinder cage monitoring system, the gas cylinder cage monitoring system comprising:
a gas cylinder storage cage, the gas cylinder storage cage including:
a frame; and
a rack within the frame, the rack defining a plurality of sensing locations;
a gas cylinder positioned at at least one of the plurality of sensing locations, the gas cylinder including a base end and a top end, the top end having a collar extending a distance away from the top end, the gas cylinder being positioned at the at least one of the plurality of sensing locations in either a first orientation or a second orientation;
a plurality of sensors, one of the plurality of sensors being at each of the plurality of sensing locations, each of the plurality of sensors being mounted within the frame proximate a one of the plurality of sensing locations, each being configured to measure a first distance from the base end of the gas cylinder when the gas cylinder is in the first orientation and to measure a second distance from the top end of the gas cylinder when the gas cylinder is in the second orientation, the first distance being less than the second distance; and
a control system in communication with each of the plurality of sensors, each of the plurality of sensors being configured to transmit at least one of the first distance and the second distance to the control system, the control system being programmable to determine the gas cylinder at each of the plurality of sensing locations is full when the sensor transmits the first distance and to determine the gas cylinder at each of the plurality of sensing locations is empty when the sensor transmits the second distance, the control system being further programmable to:
calculate a first number of gas cylinders positioned at at least one of the plurality of sensing locations that are full;
calculate a second number of gas cylinders positioned at at least one of the plurality of sensing locations that are empty; and
display the calculated first and second numbers on a graphical user interface.

20. The gas cylinder cage monitoring system of claim 19, wherein each sensor includes a light emitter and a light receiver, the light emitter being configured to direct an amount of light toward the gas cylinder and the light receiver being configured to receive the amount of light when the amount of light is reflected from the gas cylinder.

* * * * *